March 22, 1966 LE ROY A. KAUFFMAN 3,242,294
ADJUSTABLE HEAT AND COOL TYPE BIMETALLIC TOASTER CONTROL
Filed July 31, 1963 2 Sheets-Sheet 1
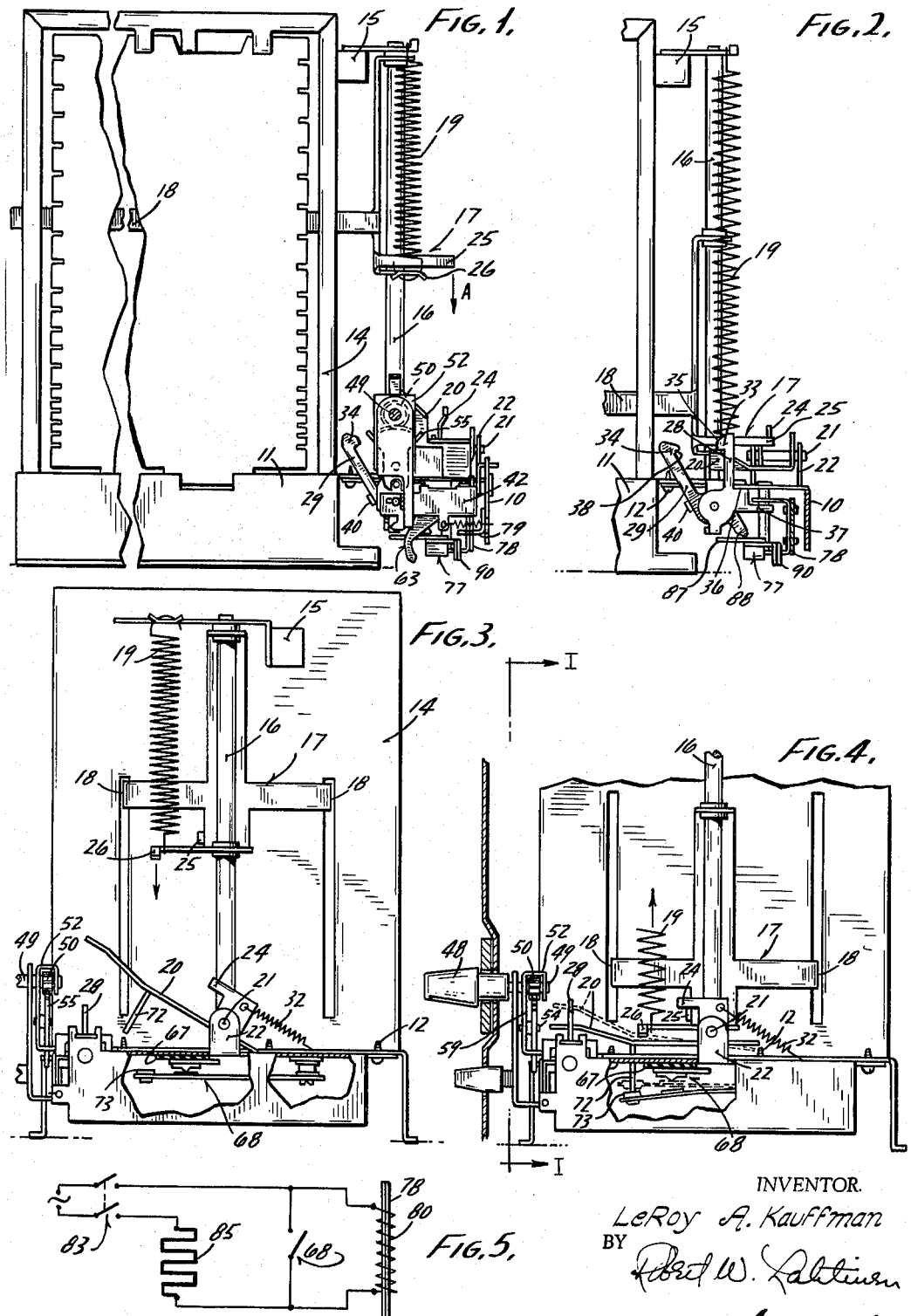
INVENTOR.
LeRoy A. Kauffman
BY
ATTORNEY.

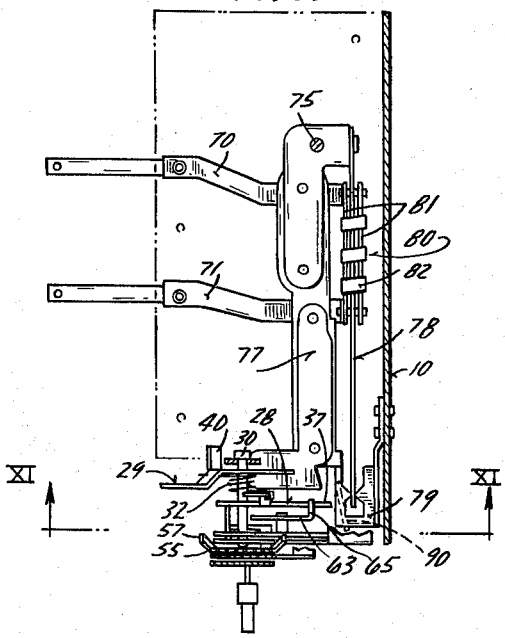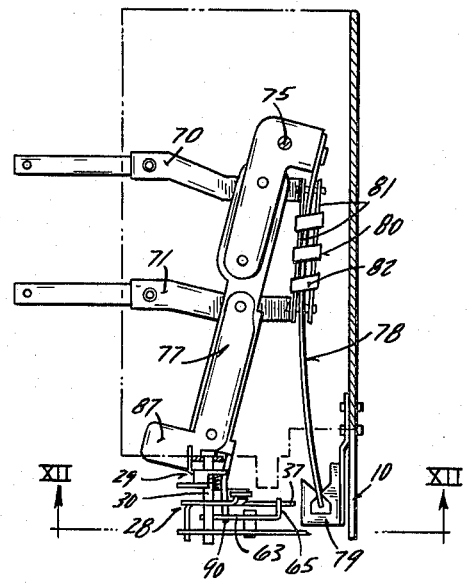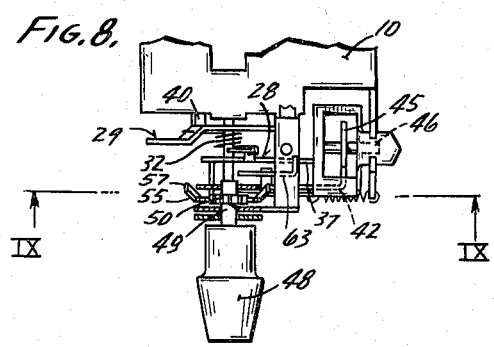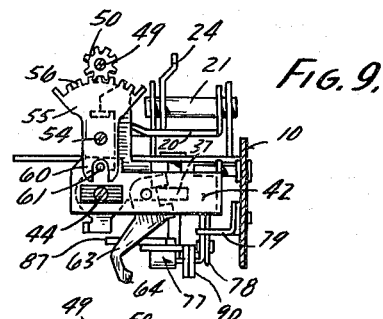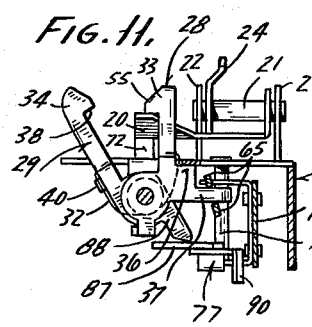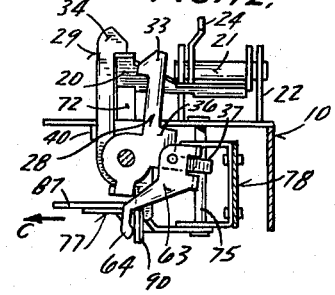

United States Patent Office 3,242,294
Patented Mar. 22, 1966

3,242,294
ADJUSTABLE HEAT AND COOL TYPE BI-METALLIC TOASTER CONTROL
Le Roy A. Kauffman, Dundee, Ill., assignor to McGraw-Edison Company, Milwaukee, Wis., a corporation of Delaware
Filed July 31, 1963, Ser. No. 299,013
4 Claims. (Cl. 200—136.3)

This invention relates to timers for automatic toasters and more specifically to an improved toaster timer of the heat up-cool down type.

A toaster timer, after factory adjustment and mounting, is provided with a color control device that in a heat up-cool down unit most commonly effects variation of toast darkness by increasing and decreasing the deflection required of the bimetal during heat up period to respectively increase and decrease the length of cycle for darker or lighter toast without disturbing the length of the cool down cycle. This method of manually adjusting the timer cycle is simple and gives excellent results throughout much of the operating range of the toaster under most conditions, but it has proved to be less than satisfactory under conditions where a number of immediately consecutive slices of bread are toasted at settings toward the dark or light ends of the range of adjustment. While the rise in the ambient temperature level tends to be self-compensating under many conditions, there is an overcompensation when the toaster is subjected to the above-described type of use. With the adjustment at the light end of the scale there is a tendency for successive slices to be toasted darker and also for successive slices to be more lightly toasted when the adjustment is at the dark end of the scale with the consequent result that successive slices tend to be of similar darkness throughout the range of adjustment. This occurs as a result of the substantially constant length of the cool off cycle causing a similar amount of recovery (cooling of the bimetal element) at all settings to cause quickly successive toasting cycles to tend toward a similar length despite variations in the control setting.

To effect a stabilization of the result throughout the range of adjustment and under all the varying conditions of service, including the shorter length cycles occasioned by the increased ambient temperature which exists when numerous immediately consecutive cycles occur, the applicant has provided an improved timing mechanism wherein the heat up and cool down cycles are simultaneously varied to afford a maintenance of the variations in cycle length throughout such varying conditions of service.

It is an object of this invention to provide an improved heat up-cool down type timing mechanism for an automatic toaster.

It is a further object of this invention to provide a timer for an automatic toaster that will function to continuously produce toast of a uniform darkness at any setting throughout the range of the color control adjustment.

These and other objects and advantages of this invention will become apparent from the following description when taken in connection with the accompanying drawings wherein:

FIG. 1 is a partial side elevation of a toaster oven of the associated timer taken along line 1—1 of FIG. 4.

FIG. 2 is a partial side elevation similar to FIG. 1 wherein the carriage is retained by the timer assembly in a toasting position.

FIGS. 3 and 4 are partial end elevations partly broken away showing the carriage respectively raised and lowered.

FIG. 5 is a schematic diagram showing the wiring of the timer and heating elements.

FIGS. 6 and 7 are plan views of the timer partially broken away showing the bimetal element respectively in cooled and heated positions.

FIG. 8 is a plan view of the escapement and color control portions of the timer.

FIG. 9 is an elevation view taken along line 9—9 of FIG. 8.

FIG. 10 is similar to FIG. 9 with portions broken away to show the color control adjusting mechanism.

FIG. 11 is an elevation taken along line 11—11 of FIG. 6.

FIG. 12 is an elevation taken along line 12—12 of FIG. 7.

Referring to FIGS. 1 and 2, a timer support or base plate 10 is mounted on the toaster main frame 11 by three self tapping screws 12. Also mounted on the main frame 11 is an oven frame 14 to which is secured a bracket 15 with a rod 16 extending from the bracket 15 to the main frame 11. Journaled about the rod 16 is a carriage 17 having toast carrying arms 18 extending from the carriage 17 through the toasting chambers of the oven. The carriage 17 has an upper loading position shown in FIG. 1 and a lower toasting position shown in FIG. 2 with a tension spring 19 interconnected between the carriage 17 and the bracket 15 to urge the carriage toward the uppermost or loading position.

A control lever 20 (as best seen in FIGS. 3 and 4) is pivotally mounted on the support 10 about a pivot pin 21 which is supported by the ears 22 that are an integral portion of the support. Formed as an integral part of the control lever 20 is a latch 24 which is oriented to engage the cantilever arm 25 of the carriage 17 when the latter is in the lowered positions indicated in FIG. 4. The control lever 20 also underlies the carriage tab 26 so that in the course of downward travel of the carriage 17 as indicated by the arrow A the tab depresses the control lever from the attitude shown in FIG. 3 to that of the solid line portion of FIG. 4.

A pair of latch levers 28, 29 are pivotally mounted on the support 10 with a spring 32 (FIG. 8) urging the upper latching portions 33 and 34 respectively toward one another. Latch lever 28 is normally disposed in the position shown in FIG. 2 wherein it will retain the control lever 20 when the latter is depressed to a position beneath the latching surface (as seen in FIG. 2). During the downward movement of the control lever, the camming surface 35 of the latch lever 28 will cause clockwise displacement permitting passage of the control lever 20 to the latching position. Latch lever 28 also has a surface portion 36, which abuts the support 10 as seen in FIG. 2, preventing further counterclockwise rotation, and a laterally extending arm 37 projecting horizontally.

Latch lever 29 presents a latching surface 38 that is adapted to retain the control lever 20 in a second or upper toasting position when rotated to an upright condition as shown in FIG. 12. A turned tab portion 40 of the latch lever 29 abuts the support 10 when the lever attains the upright position of FIG. 12 to prevent further clockwise rotation.

A plate 42 (FIG. 10) is mounted on support 10 by slotted portion 43 which surrounds pin 44 and an apertured turned portion 45 which is journaled about pin 46 and is reciprocable in the direction of the axis of pin 46. The plate 42 is selectively reciprocated by turning a knob 48 mounted on shaft 49 which also has a spur gear 50 mounted thereon for rotation in unison with knob 48. A bracket 52 upwardly extending from the support 10 has the shaft 54 and lever 55 pivotally mounted thereon. The lever 55 has a gear segment 56 formed in the upper portion which engages the spur gear 50 with tabs 57 at either end of the gear segment that engage the downwardly turned portion 59 of the bracket 52 to prevent over travel and disengagement of gear segment 56 with respect to spur gear 50. At the lower end thereof lever 55 has a bifurcated portion 60 that confines the shaft 61 which extends from and is rigidly secured to the plate 42.

Pivotally mounted on plate 42 for reciprocation in unison therewith is a lever 63 which presents a downwardly depending arm 64 and a pair of turned tabs 65 which extend on either side of and confine the laterally extending arm 37 of latch lever 28 therebetween.

As viewed in FIG. 4 there is mounted on the underside of the horizontal portion of the support 10 a sheet 67 of electrically insulating material on which is supported a normally closed switch 68 that interconnects the bus bars 70 and 71 (FIG. 6). Switch 68 is actuated by the depending arm 72 of control lever 20 which engages the porcelain cap 73 to open the switch when the control lever is pivoted downwardly.

Also mounted on the support 10 and pivotable about pin 75 is a bimetal assembly presenting a control arm 77 and a bimetal strip 78. The distal end of the bimetal strip is confined by the bracket 79 which is rigidly connected to support 10. Surrounding a portion of the bimetal strip 78 is a heater 80 having a pair of mica sheets 81 disposed on either side of the bimetal with a ribbon 82 of electrical resistance material wound therearound in heat delivering relation to the bimetal. The ribbon 82 is connected by its ends to the bus bars 70 and 71 respectively, electrically in parallel with switch 68.

In operation the carriage 17 is depressed to initiate the toasting cycle which action closes the appliance line switch 83 of FIG. 5 (by a means not shown) and depresses the control lever 20 to the condition shown in FIGS. 2 and 11 and the full line portion of FIG. 4. With the carriage retained in the lower toasting position by the latch portion 24 of the control lever 20, the switch 68 is simultaneously opened by the depending arm 72 to place the bimetal heater 80 electrically in series with the toasting element 85 as shown schematically in FIG. 5.

As the bimetal strip 78 becomes heated it deflects toward the condition shown in FIG. 7 thereby pivoting the control arm 77. As the control arm 77 pivots, the horizontal surface 87 thereof, that normally engages the depending arm 88 of latch lever 29 to pivot the latching portion thereof away from a control lever latching position, terminates such restraint of latch lever 29 allowing it to pivot to the position shown in FIG. 12. Thereafter, further movement of the control arm 77 in the direction of arrow C in FIG. 12 causes the surface 90 thereof to engage and pivot the lever 63 in a clockwise direction as viewed in FIG. 12 causing the lever 63 to engage the laterally extending arm 37 of the latch lever 28 to likewise pivot latch lever 28 in a clockwise direction. As latch lever 28 pivots out of engagement with the control lever 20 the latter is pivoted by spring 32 until again restrained in the upper toasting position by latch lever 29. In this upper toasting position, seen in the phantom view portion of FIG. 4, the switch 68 has returned to its normally closed position whereby the bimetal heater is effectively shorted out of the circuit and the bimetal strip 78 begins to cool.

As the bimetal cools the control arm 77 starts to pivot in the direction opposite that of arrow C of FIG. 12 causing it to again engage depending portion 88 of latch lever 29. When the latch lever 29 is pivoted out of engagement with the control lever 20 the latter is pivoted upward by the spring 32 to release the carriage 17 and terminate the toasting cycle.

The color control is effected by varying the position of the lever 63 through rotation of knob 48. As shown in FIG. 9 the color control is set at the medium darkness position. When the spur gear 50 is rotated in a counterclockwise direction to the position of maximum adjustment shown in FIG. 10 the plate 42 and the lever 63 are moved in the direction of arrow B. Since the arm 37 extends in a direction parallel to the path of travel of plate 42 the tabs 65 of lever 63 can be selectively reciprocated along the arm 37 without pivoting lever 63 or changing its attitude. Accordingly, the lever may be positioned at any location from the solid line position of FIG. 10 to the dotted position shown in the same figure. The solid line position (FIG. 10) represents the dark end of the control range since in this position the greatest deflection of the bimetal is required before movement of the lever 63 by contact with the control arm surface 90 terminates the heat up cycle. Similarly when the lever 63 is disposed in the dotted position the heat up cycle would be terminated with the smallest bimetal deflection corresponding to a minimum time cycle and consequently provides the lightest toast in the range of adjustment. It will be observed that by adjusting the bimetal deflection required to effect a termination of the heat up cycle with the above described device, the position of the control arm 77 when the latch lever 29 is pivoted away from latching engagement with control lever 20 to terminate the toasting cycle remains unchanged. Accordingly, when the control is adjusted to darker or lighter settings, both the heat up and cool off cycles are respectively lengthened or shortened with the result that the recovery of the bimetal is respectively greater or smaller during the cool off periods to maintain a consistent selected darkness for successively toasted bread slices at any adjustment throughout the range of control.

Although but one embodiment has been shown and described, it will be apparent to those skilled in the art that various changes and modifications may be made therein without departing from the spirit of the invention or from the scope of the appended claims.

I claim:

1. A toaster comprising a vertically movable toast-supporting carriage with an upper loading position and a plurality of lower toasting positions; a timer assembly including first and second latch levers for respectively retaining said carriage in first and second lowered toasting positions, said second position being intermediate said first position and said loading position; a bimetal assembly including a bimetallic element which deflects upon being heated; heating means disposed in heat delivering relation to said bimetallic element and energized when said carriage is retained in said first lowered toasting position; release means which move said first latch lever from a carriage retaining attitude when said bimetallic element has reached a first predetermined deflection; said second latch lever being disposed in a carriage retaining position when said first latch lever is moved from a carriage retaining attitude and movable to a carriage releasing position when said bimetallic element reaches a second predetermined deflection; and a support member having said release means mounted thereon, said support member being manually movable to selectively vary said first predetermined deflection independently of said second predetermined deflection.

2. A toaster timer of claim 1 wherein said first latch member is pivotable about a first axis and said release means comprises a release member pivotally mounted on said support member about an axis parallel to said first axis and presenting a portion in the path of said bimetal assembly, said release member engaging said first latch lever to move said first latch lever from a carriage retaining attitude upon pivoting of said release member by said bimetal assembly.

3. A heat up-cool down type timer for an automatic toaster comprising first and second pivotally mounted latch members each respectively pivotable between latching and non-latching positions; biasing means urging said first and second latch members toward said latch positions; a bimetal assembly including a bimetallic element which deflects upon being heated to move said bimetal assembly; heating means disposed in heat delivering relation to said bimetallic element; a pivotally mounted release member adjacent to and engageable with said first latch member to move said first latch member away from a latching position and having a depending portion extending into the path of said bimetal assembly engageable with and movable by said bimetal assembly upon heating of said bimetallic element to cause said release member to move said first latch member to said non-latching position; a movable support having said release member mounted thereon; manually operable means for selectively moving said support to thereby position said release member depending portion in various locations along the path of said bimetal assembly; and means for moving said second latch means to a non-latching position when said bimetallic element attains a predetermined deflection irrespective of the position of said movable support.

4. An automatic toaster comprising a vertically movable toast supporting carriage with an upper loading position and first and second lowered toasting positions; a timer assembly including first and second latch levers mounted about common pivot axis for respectively retaining said carriage in said first and second toasting positions, said second toasting position being intermediate said first toasting position and said loading position, a bimetal assembly including a bimetallic element which deflects upon being heated to move said bimetal assembly, and heating means disposed in heat delivering relation to said bimetallic element and energized when said carriage is retained in said first lowered toasting position; a support member mounted on said timer assembly for movement in a plane perpendicular to said first axis; a bell crank pivotally mounted on said support member about an axis parallel to said common axis, and comprising a first arm engageable with said first latch lever when pivoted in one direction to pivot said first latch away from a latching position and a second arm depending in the path of said bimetal assembly to cause said bimetal to pivot said bell crank in said one direction as said bimetallic element is heated and manual operating means connected to said support member for selectively moving said support member to move said second arm to various positions in the path of said bimetal assembly.

References Cited by the Examiner

UNITED STATES PATENTS

| 2,696,160 | 12/1954 | Horvath | 99—329 |
| 2,969,010 | 1/1961 | Andrews et al. | 99—329 |

BERNARD A. GILHEANY, *Primary Examiner.*

H. M. FLECK, *Assistant Examiner.*